United States Patent

[11] 3,622,972

| [72] | Inventor | Edward E. Herceg<br>Lakewood, Ohio |
|---|---|---|
| [21] | Appl. No. | 10,786 |
| [22] | Filed | Feb. 12, 1970 |
| [45] | Patented | Nov. 23, 1971 |
| [73] | Assignee | The Weatherhead Company<br>Cleveland, Ohio |

[54] BRAKE FAILURE WARNING PRESSURE SWITCHES
15 Claims, 8 Drawing Figs.

[52] U.S. Cl. ................................................... 340/52 C,
200/82
[51] Int. Cl. ................................................... B60q 1/00,
G08b 21/00
[50] Field of Search ......................................... 340/52, 52
C, 60; 200/82; 303/84

[56] References Cited
UNITED STATES PATENTS

| 3,450,853 | 6/1969 | Snyder .......................... | 340/52 X |
| 3,168,008 | 2/1965 | Bingel .......................... | 340/52 UX |
| 3,475,573 | 10/1969 | Maltais et al. ................ | 340/52 X |
| 3,011,595 | 12/1961 | Heiss et al..................... | 188/1 |
| 3,374,322 | 3/1968 | Miller............................ | 200/82 |
| 3,412,557 | 11/1968 | Williams........................ | 60/54.6 |
| 3,439,322 | 4/1969 | Gardner........................ | 340/52 |
| 3,439,323 | 4/1969 | Kersting....................... | 340/52 |

*Primary Examiner*—Alvin H. Waring
*Attorney*—McNenny, Farrington, Pearne and Gordon ABSTRACT: A warning switch is disclosed for continuously actuating an alarm device in response to a momentary fluid pressure unbalance in a dual hydraulic brake system. A piston is slidably disposed in the switch housing for movement in response to a fluid pressure unbalance. A switch contact unit having an insulated terminal and an insulated contact stud is detachably mounted on the switch housing. When the piston is momentarily displaced in response to a momentary fluid pressure unbalance, the terminal is grounded through the contact stud and through the piston to momentarily actuate the alarm device. A latching relay means is disposed within the switch contact unit housing and provides a continuous ground for the terminal in response to the momentary ground provided through the piston. In a first embodiment, the alarm device and the latching relay circuit are arranged in series, and a prove-out switch for testing the alarm device is interposed between the alarm device and the latching relay circuit. In a second embodiment and a third embodiment, the latching relay circuit is arranged in parallel with the alarm device, and an isolation means prevents actuation of the latching relay by the prove-out switch. In the second embodiment this isolation means includes a double pole latching relay, and in the third embodiment this isolation means includes a diode.

INVENTOR
EDWARD E. HERCEG
BY
McNENNY, FARRINGTON, PEARNE & GORDON
ATTORNEYS

BRAKE FAILURE WARNING PRESSURE SWITCHES

BACKGROUND OF THE INVENTION

This invention relates generally to warning switches for actuating an alarm device in response to a fluid pressure failure in a motor vehicle dual hydraulic brake system, and more particularly to such a warning switch in which the alarm device is continuously actuated in response to a momentary fluid pressure unbalance.

Warning switches are commonly used in motor vehicle dual hydraulic brake systems to provide a ground connection to actuate an alarm device such as an indicator lamp in response to a fluid pressure failure in one or the other hydraulically isolated branch of the dual system. One such warning switch is of the type disclosed in U.S. Pat. No. 3,374,322 granted to Paul J. Miller on Mar. 19, 1968. This type of warning switch includes a switch housing having a first fluid pressure port exposed to the fluid pressure of the front branch of the dual system and a second fluid pressure port exposed to the fluid pressure of the rear branch of the dual system. An axial bore interconnects the fluid pressure ports, and a shuttle piston is slidably disposed within the axial bore to maintain fluid pressure isolation between the ports. One radial end face of the piston is exposed to the fluid pressure in the front branch, and the other radial end face of the piston is exposed to fluid pressure in the rear branch. A spring means maintains the piston in a substantially centered position when the fluid pressures are substantially equal. A transverse bore extends through the housing and intersects the axial bore, and a warning switch contact unit is received by the transverse bore. The contact unit includes a contact stud which is electrically insulated from the housing and which extends into the axial bore adjacent a reduced diameter central portion of the shuttle piston. A substantial fluid pressure unbalance between the two ports shifts the shuttle piston in the bore so that a normal diameter portion of the piston adjacent the reduced diameter portion contacts the electrically insulated stud to ground the stud through the housing and complete an electrical circuit to actuate an alarm device. Release of the fluid pressure in the dual system then permits the spring means to return the shuttle piston to its center position to break contact with the electrically insulated contact stud and deactuate the alarm device.

Although such momentary contact shuttle piston warning switches have received substantial commercial acceptance, other types of warning switches must be used where continuous actuation of the alarm device is desired in response to a momentary fluid pressure unbalance. For this reason, it has been necessary in the past to also provide a continuously actuated type warning switch which remains closed after the pressure unbalance has been eliminated and which requires either disassembly and resetting or else complete replacement of the unit to restore the system to its normal condition after remedying the condition which caused the original pressure unbalance.

Prior attempts to solve this problem have used a latching relay circuit arranged externally between the warning switch and the alarm device but have not received substantial acceptance. If such a latching relay circuit is arranged in series with the alarm device, which may be a dashboard indicator lamp, the voltage drop across the relay coil must be quite small so as not to affect the brilliance of the lamp, and the current flow through the relay coil is limited by the maximum permissible current flow through the indicator lamp. For this reason, it may be difficult to provide sufficient power to the latching relay coil of such a series circuit to reliably actuate the relay. On the other hand, if the latching relay circuit is arranged in parallel with the indicator lamp so that the current flow through the relay coil may be greater than the current flow through the indicator lamp, a problem arises in that a prove-out switch arranged to test the alarm device might also actuate the latching relay.

SUMMARY OF THE INVENTION

The first aspect of the present invention overcomes the foregoing problems in prior art warning switches by providing a warning switch which provides continuous actuation of an alarm device in response to a momentary fluid pressure unbalance, but which may be easily altered to provide only momentary actuation if desired. The warning switch is provided with a detachable switch contact unit which includes a terminal for providing a ground connection for an alarm device and a means for continuously grounding the terminal to continuously actuate the alarm device in response to a momentary fluid pressure unbalance. By simply changing the detachable contact unit, the continuous actuation type warning switch provided by the invention may be altered to provide only momentary actuation of the alarm device.

This is accomplished according to this first aspect of the invention by providing a momentary contact shuttle piston type warning switch with a detachable contact unit having an electrically insulated terminal and an electrically insulated contact stud. The contact stud is arranged such that the shuttle piston will engage the contact stud to momentarily complete the electrical circuit through the terminal in response to a momentary fluid pressure unbalance in a dual hydraulic brake system. The detachable contact unit is further provided with a means for continuously completing the electrical circuit through the terminal to continuously actuate the alarm device in response to such momentary completion of the electrical circuit.

This first aspect of the invention is incorporated in a first embodiment by providing a warning switch with a switch contact unit having a latching relay means for continuously grounding a terminal in response to momentary grounding of the terminal. The relay means includes a relay coil and a relay switch positioned for actuation by the electromagnetic force produced when current passes through the coil. In the event of fluid pressure unbalance, momentary grounding of a contact stud by a shuttle piston actuates the alarm device by grounding the terminal through the relay coil. This actuates the relay switch, which provides a supplemental ground for the terminal through the coil so that the circuit will be completed to produce a latching operation and maintain the alarm device continuously actuated even after the shuttle piston returns to its central position. The insulating sleeve for the normally electrically insulated contact stud provides a core for the relay coil.

In this first embodiment of the invention, the warning device is arranged in series with the alarm device. In this manner momentary operation of the alarm device is provided even in the event the relay switch fails to be actuated by the coil. Furthermore, this arrangement permits a prove-out switch for testing the alarm device to be arranged in the circuit intermediate the alarm device and the warning switch so that the prove-out switch can be closed to test the alarm device without actuating the coil of the warning switch contact unit.

According to a second aspect of the invention, a detachable warning switch contact unit according to the broader principles of the invention and a latching circuit are provided which may be arranged in parallel with the alarm device. This arrangement permits the current flow through the relay coil of the contact unit to be greater than the current flow through the alarm device, which may be an indicator light, to insure reliable operation of the contact unit relay. To prevent actuation of the contact unit relay in this parallel circuit arrangement by the prove-out switch, the invention provides an isolation means to isolate the prove-out circuit from the warning switch relay circuit.

This second aspect of the invention is incorporated in a second embodiment, wherein the isolation means is a double pole relay switch which prevents actuation of the relay coil and consequent continuous operation of the alarm device when the prove-out switch is momentarily closed to test the alarm device. A third embodiment incorporates this second aspect of the invention by providing an isolation means for isolating the prove-out circuit from the warning switch circuit which includes a diode arranged to block the flow of current through the coil when a prove-out switch is closed to test the alarm device.

BRIEF DESCRIPTION OF THE DRAWINGS

These and other aspects and advantages of the invention will become more readily apparent to those skilled in the art upon a full understanding of the preferred embodiments of the invention described in detail herein and shown in the accompanying drawings, wherein.

DESCRIPTION OF THE PREFERRED EMBODIMENTS

First Embodiment

Figures 1, 2:
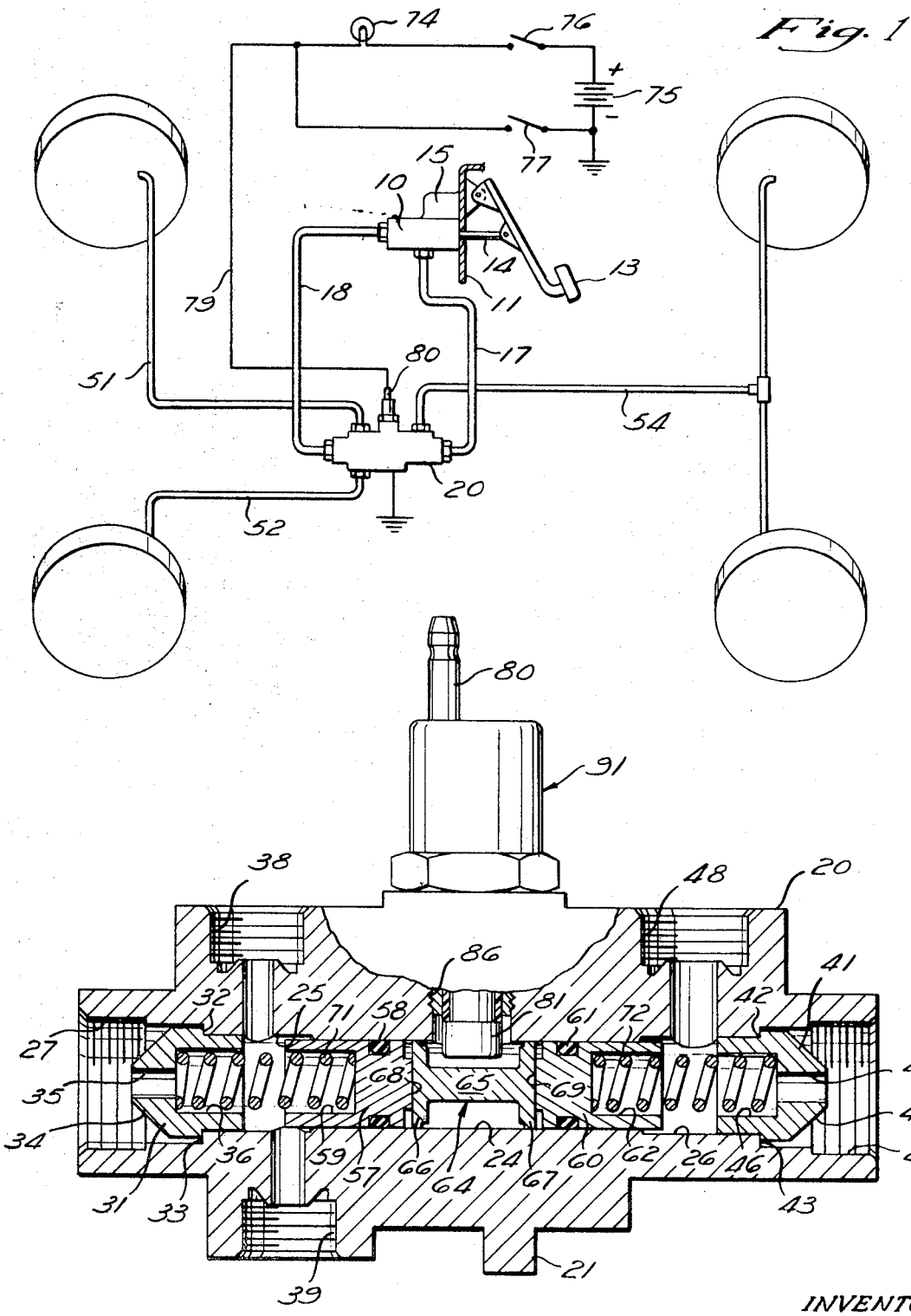
FIG. 1 is a schematic circuit diagram of a dual hydraulic brake system for a motor vehicle according to the principles of the invention.
FIG. 2 is an enlarged side elevational view, partly in cross section, of the warning switch shown in FIG. 1.

Referring now to the drawings in greater detail, FIG. 1 is a schematic showing of a braking system for an automobile in which a master cylinder 10 is mounted on the firewall 11 within the engine compartment, and a pivotally mounted foot pedal 13 acts on a piston rod 14 to produce the hydraulic pressure necessary for actuating the brakes. A reservoir 15 on top of the master cylinder supplies hydraulic fluid and the master cylinder, being of the dual type, has two outlet lines 17 and 18 for two separate hydraulic brake circuits for the front wheels and the rear wheels of the automobile. It will be understood that the master cylinder 10 is arranged so that at all times, assuming no leakage in the system, the lines 17 and 18 will be provided with substantially the same fluid pressure as required to actuate the brakes in accordance with the pressure applied to the foot pedal 13.

Figure 3:
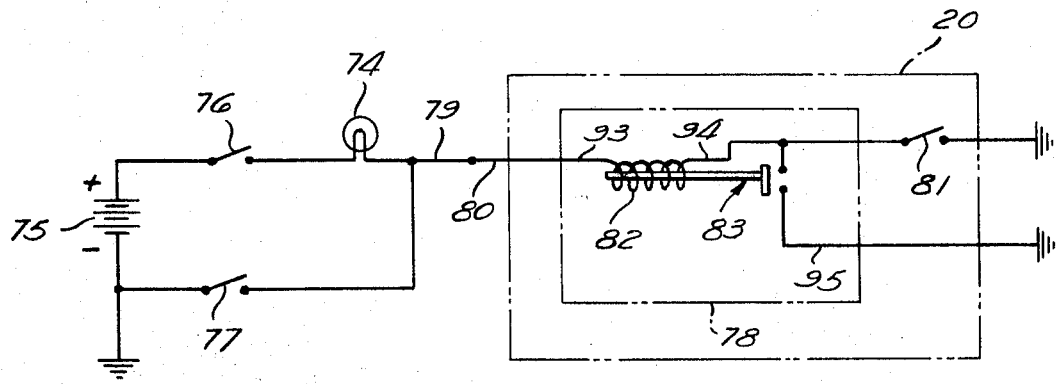
FIG. 3 is an electrical schematic circuit diagram showing the details of the detachable switch contact unit used in the warning switch shown in FIGS. 1 and 2.
Figure 4:
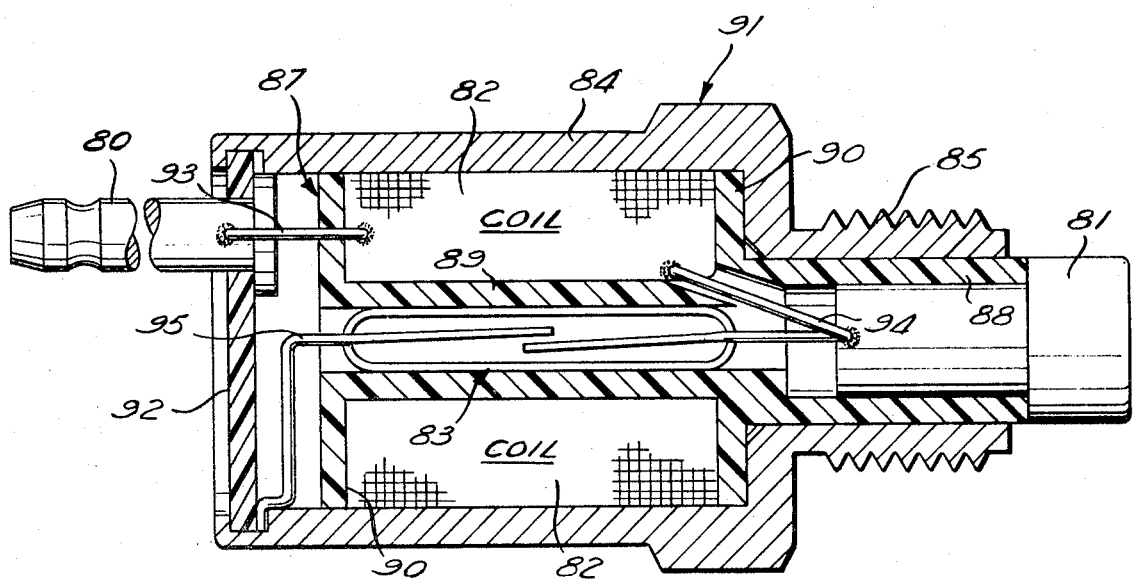
FIG. 4 is an enlarged cross-sectional view of the detachable switch contact unit used in the warning switch shown in FIGS. 1 and 2.

The brake lines 17 and 18 lead to the warning switch as shown in greater detail in FIGS. 2, 3, and 4. The switch has a housing 20 which may be formed with a projecting lug 21 so that the housing may be mounted on a bracket or a portion of the vehicle frame in any suitable manner and to provide electrical grounding for completion of the electric circuit as described in greater detail hereinafter. The housing 20 has an axial bore 24 extending lengthwise therethrough, and slightly enlarged counterbores 25 and 26 at the left and right ends respectively of the bore 24. A threaded inlet 27 is formed in the housing at the left counterbore 25 to receive the front brake line 18 from the master cylinder 10 by a suitable fitting such as the inverted flare type and, likewise, at the right end of counterbore 26 is a threaded inlet 28 to which is connected the line 17 for the rear brakes of the vehicle.

Within the left counterbore 25 is mounted a plug 31 having a shoulder 32 which engages a mating shoulder 33 formed in the counterbore 25 to axially position the plug against inward movement into the counterbore. This plug may be a relatively loose fit in the counterbore and is positively positioned by the shoulders 32 and 33. The outer end of the plug is formed as a conical end 34 to receive an inverted flare type fitting for connection between the front brake line 18 and the inlet 27. The plug 31 is formed with a passage 35 therethrough which at its inner end opens into an enlarged recess 36 so that the fluid entering through the inlet 27 passes through the plug passage into the interior of the counterbore 25. A pair of fluid outlets 38 and 39 are formed in the housing 20 and are threaded to receive suitable fittings and open off the counterbore 25 so that they may be connected by lines 51 and 52 to the front wheel brakes.

In a similar manner, the right counterbore 26 is provided with a plug 41 having a shoulder 42 which abuts against a mating shoulder 43 in the counterbore. The plug 41 has a conical end 44 to receive an inverted flare type fitting and has an axial passage 45 therethrough which opens into a recess 46 on the inner end of the plug. It will be understood that plugs 31 and 41 are substantially identical in construction. Thus, the fluid for the rear brakes passes from the master cylinder through line 17 to the inlet 28 and from there to the passage 45 in the plug 41 into the counterbore 26. A suitable threaded outlet 48 opens off the counterbore 26 for connection to the rear wheel brakes through a suitable line 54.

Within the axial bore 24 inward of the counterbore 25 is located a shuttle piston unit which includes a left piston 57 which makes sealing contact with the bore by means of an O-ring seal 58 carried in a groove on the piston intermediate its ends. Likewise, in the right end of the bore 24 inward of the counterbore 26 is a right piston 60 of the shuttle piston unit similar in construction to the piston 57 and making sealing contact with the bore 24 by an O-ring seal 61. At their outer ends facing the respective counterbores, the pistons 57 and 60 have cup-shaped recesses 59 and 62 to provide an elongated skirt portion to increase the bearing surface against the sides of the bore 24 to minimize tipping or cocking portions the pistons.

The pistons 57 and 60 are spaced apart by a spool shaped spacer 64 mounted in the axial bore 24 between the two pistons. The spacer 64 has a central axially extending portion 65 of a reduced diameter considerably less than that of the bore 24. At each end of the center section 65 the spacer 64 is provided with integral wall portions 66 and 67 which have parallel radially extending sides and an outer periphery making a loose clearance fit with the bore 24 to allow free sliding movement of the spacer 64 but with a minimum amount of clearance so as to prevent any cocking or tilting of the spacer for the reasons set forth in greater detail hereinafter. The pistons 57 and 60 each have reduced diameter projections 68 and 69, respectively, on the inner faces to engage the outer sides of the spool walls 66 and 67 so that the forces between the pistons and the spacer are applied substantially at a central or axial point rather than over the full face of the outer sides of the walls 66 and 67.

In order to bias the pistons 57 and 60 to a central position, helical compression biasing springs 71 and 72 are mounted between the pistons and the left and right plugs 31 and 41. Thus, the left spring 71 fits within the recess 36 in the plug 31 at the outer end and within the recess 59 in the piston 57 at the inner end. Likewise, the right spring 72 extends between the piston recess 62 and the plug recess 46. Since the plugs 31 and 41 are firmly held in position by the fittings and the plugs when the unit is assembled in the brake system, these springs 71 and 72 provide equal biasing forces so as to insure that the pistons 57 and 60 and the spacer 64 will be centrally positioned within the bore 24.

As best seen in FIGS. 1 and 3, the warning system of the first embodiment of the invention includes an alarm device 74, which is preferably an indicator light mounted on the dashboard of the motor vehicle. An automobile battery 75 provides the electric power for the system, and the negative terminal of the battery 75 is grounded. An ignition switch 76 of the motor vehicle is connected in series with the battery 75 and the alarm device 74 to insure that the alarm device 74 will be disconnected from the battery 75 when the motor vehicle is not in use. A prove-out switch 77, which may be the ignition switch when the ignition switch is in the start position or which may be a switch which is actuated by engaging the emergency brake of the vehicle, is provided to test the alarm device 74 whenever the ignition switch 76 is also closed. A connecting wire 79 connects the ground side of the alarm device 74 to the terminal 80 of the warning switch. Since the housing 20 of the warning switch is grounded, the alarm device 74 will be energized when the ignition switch 76 is closed by electrically connecting the terminal 80 to ground through the housing 20.

When the warning switch is connected in a hydraulic brake system as shown in FIG. 1, the pressures coming from the master cylinder 10 through the lines 17 and 18 and communicating to the inlets 27 and 28 are substantially balanced, and therefore the pistons 57 and 60 will not move any substantial distance within the bore 24 unless the pressures in the lines 17 and 18 become substantially unbalanced. This unbalance can result from a loss of fluid either upstream or downstream from the warning switch on either the front or rear brakes or from a loss of fluid supplied to the master cylinder affecting only one of the lines 17 or 18. In the event of such pressure unbalance indicating a failure of corresponding set of brakes when pressure is applied to the master cylinder 10 by the foot pedal 13, the resulting higher pressure buildup at one of the inlets will cause the shuttle piston unit to shift against the bias of spring 71 or spring 72 to shift the piston unit spacer 64 away from the center position in the bore shown in FIG. 2. When this happens, one of the larger diameter portions 66 or 67 will engage a contact stud 81, which is electrically connected to the terminal 66 but electrically insulated from the housing 20, to complete the electrical circuit and actuate the warning device 74.

As seen in FIG. 3, the first embodiment of the invention further includes a latching relay circuit 78 to maintain the alarm device 74 continuously actuated in response to such momentary grounding of the contact stud 81. When the ignition switch 76 is closed and the stud 81 is grounded indicating a failure in one or the other branches of the system, the alarm device 74 is actuated and current flows through a relay coil 82 to close a relay switch 83 which provides a supplemental ground for the circuit. When the force on the brake pedal 13 is released to release the fluid pressure in both branches of the system and the spacer 64 returns to its center position to electrically isolate the contact stud 81 therefrom, the alarm device 74 remains continuously actuated through the coil 82 and the switch 83. It may be appreciated that this supplemental grounding arrangement of the first embodiment provides a fail safe operation, since the alarm device 74 is momentarily actuated by momentary grounding of the stud 81 even if the switch 83 fails to be actuated by the coil 82. The warning circuit is deactivated by turning off the ignition switch 76, which deenergizes the coil 82 to open the switch 83. When the ignition switch 76 is again turned on, the above-described latching cycle will be repeated when the brake pedal is actuated if a failure still exists.

Further according to the principles of the invention, the latching relay circuit 78 is encased within a detachable switch contact unit 91. In the first embodiment shown in FIG. 4, the detachable switch contact unit includes a contact unit housing 84 having a reduced diameter threaded end portion 85 threadably received by a threaded transverse bore 86 of the housing 20. An insulating sleeve 87 is received within the housing 84, and the contact stud 81 is suitably secured within an end portion 88 of the sleeve 87 to electrically insulate the stud 81 from the housing 20. The insulating sleeve 87 further includes a generally cylindrical projecting skirt portion 89 and radially extending sidewalls 90. The skirt portion 89 and the sidewalls 90 of the insulating sleeve serve as a coil form to permit the relay coil 82 to be wound thereon. The relay switch 83 is a suitable reed switch disposed within the center of the coil form 89 so that it is actuated by the magnetomotive force produced by the coil 82 when current is flowing therethrough. A reed switch is chosen for the series circuit of the first embodiment because it can be actuated by a relatively low magnetomotive force, and hence it requires only a relatively low current flow through and a relatively low-voltage drop across the actuating coil 82. The insulating sleeve 87 with the coil 82 wound thereon and the reed switch 83 in place is positioned within the body 84, and an insulating end cap 92 which carries the terminal 80 is secured in place. As seen in FIG. 4, the terminal 80 is electrically connected to one lead of the coil 82 by the conductor 93, and a conductor 94 electrically connects the other side of the coil 82 to the stud 81 and one terminal of the reed switch 83. The other terminal of the reed switch 83 is grounded to the housing 84 by the conductor 95.

In this manner, the invention provides a warning switch which may be used either as a switch for continuously actuating an alarm device or as a switch for momentarily actuating an alarm device, since the switch contact unit 91 shown in FIG. 4 can be simply replaced by a switch contact unit in which the stud 81 is directly connected to the terminal 80 when momentary actuation is desired. Furthermore, the invention provides such a warning switch that can be installed in a motor vehicle in the same manner as conventional warning switches without requiring additional assembly procedures.

Although the broader principles of the invention may be practiced in the series type warning switch shown in the first embodiment of the invention, such a series circuit is subject to certain disadvantages which are overcome by further aspects of the invention embodied in second and third embodiments described in detail hereinafter. Since the alarm device is generally an indicator lamp, the voltage drop across the relay coil must be quite small to maintain the lamp brilliance. Furthermore, since the maximum permissable current flow through the indicator lamp is generally quite small, the relay coil current must likewise be small. These two factors limit the power that may be supplied to the relay to insure reliable operation thereof. Furthermore, it is not desirable to use a low-voltage lamp, since this would disrupt the interchangability of lamps on the vehicle and further since this would require a resistance means in the prove-out circuit. Although these disadvantages of the first embodiment of the invention have been pointed out for the purpose of explaining the utility of the aspects of the invention incorporated in the second and third embodiments, the first embodiment is nevertheless operable in a satisfactory manner in a dual fluid pressure warning circuit.

Second Embodiment

Figure 5:
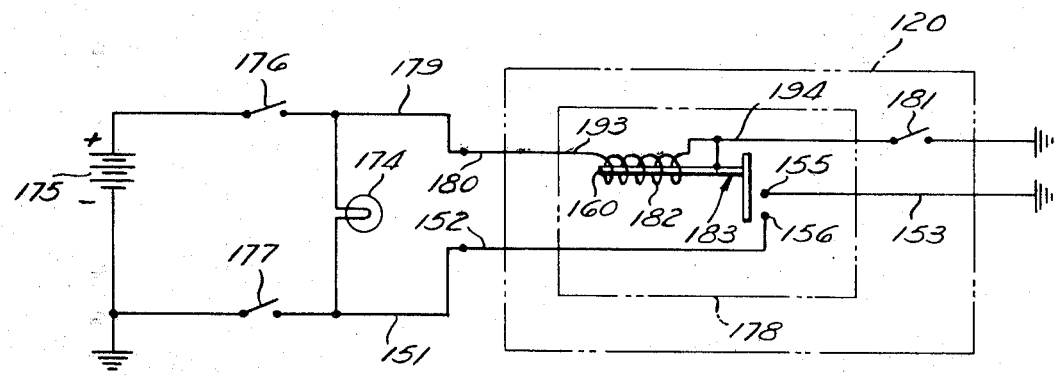
FIG. 5 is a schematic circuit diagram of a second embodiment of a warning switch circuit according to the principles of the invention.
Figure 6:
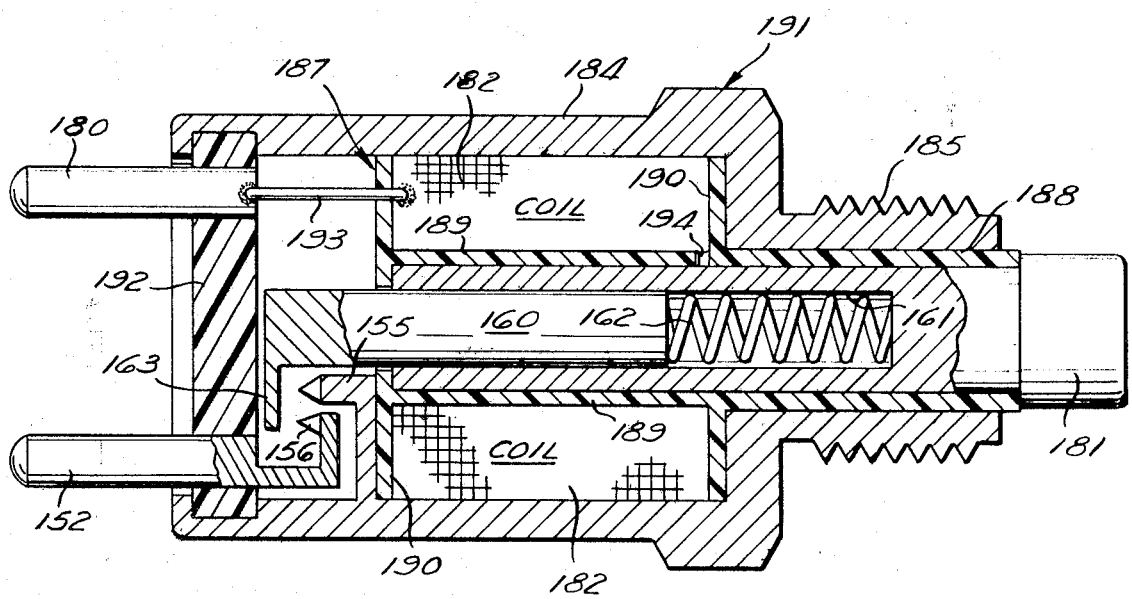
FIG. 6 is an enlarged cross-sectional view of the second embodiment, the electrical circuit of which is shown in FIG. 5.

In a second embodiment of the invention shown in FIGS. 5 and 6, a detachable warning switch contact unit is provided in which the relay coil is in parallel with the alarm device. This arrangement permits the current flow through the relay coil of the contact unit to be greater than the current flow through the alarm device to insure reliable operation of the contact unit relay. To prevent actuation of the contact unit relay by the prove-out switch, the invention provides an isolation means to isolate the prove-out circuit from the warning switch circuit. The detachable switch contact unit shown in FIGS. 5 and 6 is utilized in a warning switch housing 120 (shown schematically in FIG. 5), which is identical to the warning switch housing 20 of the first embodiment. The warning switch of the second embodiment is used in a dual hydraulic brake system of a motor vehicle such as shown in FIG. 1, but with the electrical circuit arranged as in FIG. 5.

As seen in FIGS. 5 and 6, the second embodiment of the invention includes an alarm device 174, which is preferably an indicator light mounted on the dashboard of the motor vehicle. An automobile battery 175 provides the power for this system and the negative terminal of the battery 175 is grounded. An ignition switch 176 of the motor vehicle is connected in series with the battery 175 and the alarm device 174 to insure that the alarm device 174 will be disconnected from the battery 175 when the motor vehicle is not in use. A prove-out switch 177, which may be the ignition switch when the ignition switch is in the start position or which may be a switch which is actuated by engaging the emergency brake of the vehicle, is provided to test the indicator lamp 174 whenever the ignition switch 176 is also closed. A conductor 179 connects the positive side of the lamp 174 to a first terminal 180 of the warning switch, and a conductor 151 electrically connects the ground side of the lamp 174 to a second terminal 152 of the warn switch.

The second embodiment of the invention further includes a latching relay circuit 178 to maintain the alarm device 174 continuously actuated in response to a momentary fluid pressure unbalance. In the event of such a fluid pressure unbalance, the contact stud 181 of the switch contact unit is grounded by engagement with the displace shuttle piston. This completes an electrical circuit through the conductor 179 and the first terminal 180 to energize a relay coil 182. Energization of relay coil 182 actuates a latching relay switch 183 which includes a first pole 155 to provide a supplemental ground for the coil 182 through a conductor 153. When the latching relay switch 183 is so actuated by energization of the coil 182, a second pole 156 of the latching switch 183 connects the second terminal 152 to the grounded conductor 153 to actuate the alarm device 174. When the pressure unbalance in the dual system decreases to permit the shuttle piston to return to its center position, the alarm device 174 will remain continuously actuated, since energization of the coil 182 will continue through the supplemental ground connection provided by switch 183. The warning circuit is deactuated by turning off the ignition switch 176, which deenergizes the coil 182. When the ignition switch 176 is again turned on, the above-described latching cycle will be repeated when the brake pedal is actuated if a failure still exists.

To prevent actuation of the relay coil 182 in this parallel circuit, an isolation means is provided according to further aspects of the invention which isolates the warning circuit from the prove-out circuit to prevent energization of the coil 182 and actuation of the switch 183 when the prove-out switch 177 is closed to test the alarm device 174. This aspect of the invention permits the relay coil to be arranged in parallel with the alarm device, and provides such a parallel circuit in which a prove-out circuit can also be used to test the alarm device. This aspect of the invention is incorporated in the second embodiment of the invention by providing the double pole relay switch 183. When the coil 182 is deenergized so that the switch 183 is opened, and when the ignition switch 176 is closed, actuation of the prove-out switch 177 will actuate the alarm device 174. However, when this occurs, the opened switch 183 prevents energization of the coil 182.

Although this aspect of the invention could be practiced by arranging the relay circuit 178 externally of the warning switch, the latching relay circuit 178 is preferably incorporated in a detachable switch contact unit in accordance with aspects of the invention described in detail hereinbefore primarily in connection with the first embodiment. This is accomplished in the second embodiment as shown in FIG. 6 by providing a detachable switch contact unit 191 which includes a housing 184 having a reduced diameter threaded end portion 185 adapted to be threadably received by a threaded transverse bore of the housing 120. An insulating sleeve 187 is received within the housing 184, and the contact stud 181 is suitably secured within an end portion 188 of the sleeve 187 to electrically insulate the stud 181 from the housing 120. The insulating sleeve 187 further includes a generally cylindrical skirt portion 189 and radially extending sidewalls 190. The skirt portion 189 and the sidewalls 190 of the insulating sleeve serve as a coil form to permit the relay coil 182 to be formed thereon. The relay switch 183 includes an armature 160 received within a bore 161 which extends from the left end face of the contact stud 181. A coil spring 162 biases the armature 160 to the left as shown in FIG. 6 to maintain the switch 183 normally opened. The insulating sleeve 187 with the coil 182 wound thereon is positioned within the body 184, and an insulating end cap 192 which carries the terminals 180 and 152 is secured in place. The first terminal 180 is electrically connected to one lead of the coil 182 by a conductor 193, and a conductor 194 electrically connects the other side of the coil 182 to the armature 160.

When the stud 181 is momentarily grounded by the shuttle piston to energize the coil 182, the magnetomotive force produced by the coil 182 forces the armature 160 against the force of the spring 162 to the right so that a projecting ear 163 engages the first and second poles 155 and 156. This completes the above-described warning circuit to actuate alarm device 174. When the brakes are released and the shuttle piston returns to its center position, the alarm device remains continuously actuated by the supplemental ground provided by the continuously actuated relay switch 183.

Third Embodiment

Figure 7:
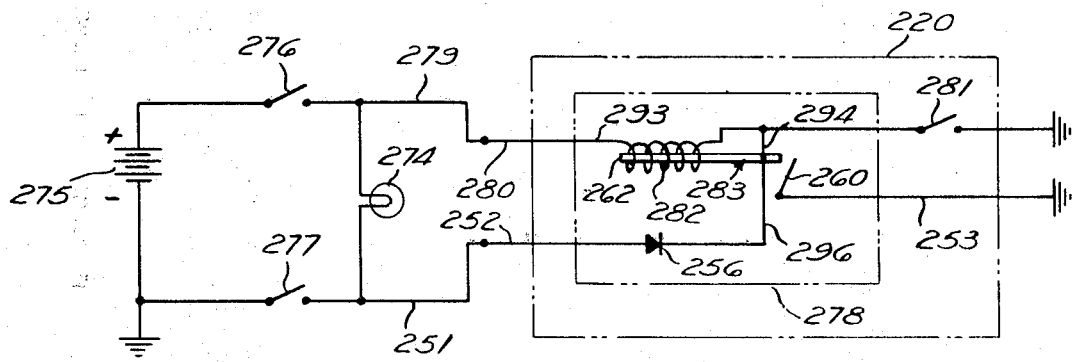
FIG. 7 is a schematic circuit diagram of a third embodiment of a warning switch circuit according to the principles of the invention; and, FIG. 8 is an enlarged cross-sectional view of the third embodiment, the electrical circuit of which is shown in FIG. 7.
Figure 8:
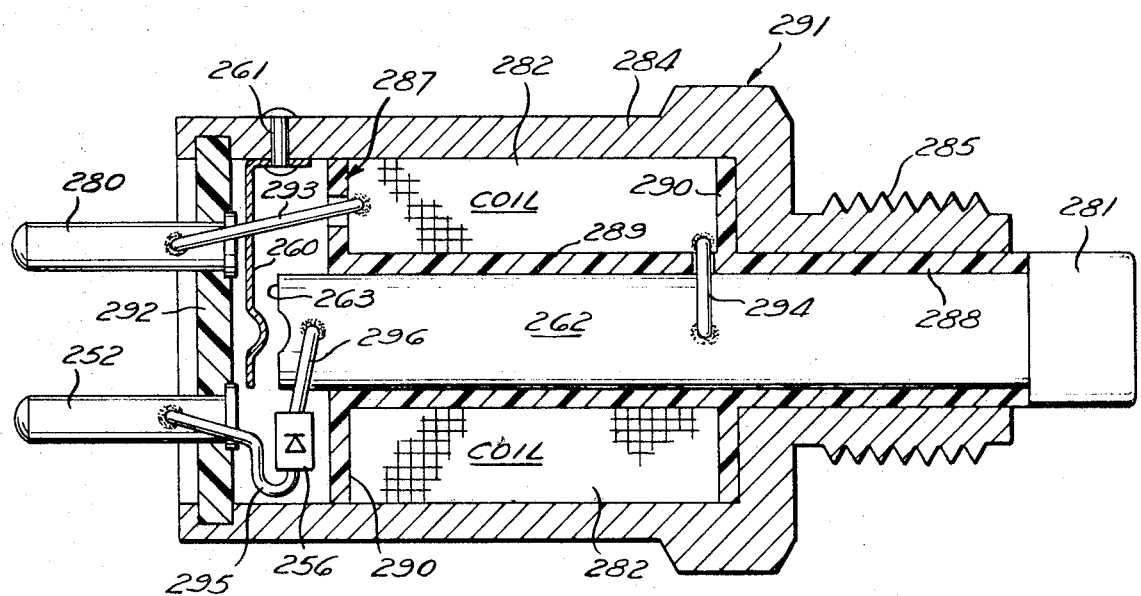

In a third embodiment of the invention shown in FIGS. 7 and 8, a detachable warning switch contact unit according to the broader principles of the invention is provided which may be arranged in parallel with the alarm device. This arrangement permits the current flow through the relay coil of the contact unit to be greater than the current flow through the alarm device to insure reliable operation of the contact unit relay. To prevent actuation of the contact unit relay by the prove-out switch, the invention provides an isolation means to isolate the prove-out circuit from the warning switch circuit. The detachable switch contact unit shown in FIGS. 7 and 8 is utilized in a warning switch housing 220 (shown schematically in FIG. 7), which is identical to the warning switch housing 20 of the first embodiment. The warning switch of the third embodiment is used in a dual hydraulic brake system of a motor vehicle such as shown in FIG. 1, but with the electrical circuit arranged as in FIG. 7.

As seen in FIGS. 7 and 8, the third embodiment of the invention includes an alarm device 274, which is preferably an indicator light mounted on the dashboard of the motor vehicle. An automobile battery 275 provides the power for this system, and a negative terminal of the battery 275 is grounded in the embodiment. An ignition switch 276 of the motor vehicle is connected in series with the battery 275 and the alarm device 274 to insure that the alarm device 274 will be disconnected from the battery 275 when the motor vehicle is not in use. A prove-out switch 277, which may be the ignition switch when the ignition switch is in the start position, or which may be a switch which is actuated by engaging the emergency brake of the vehicle, is provided to test the indicator lamp 274 whenever the ignition switch 276 is also closed. A conductor 279 connects the positive side of the lamp 274 to a first terminal 280 of the warning switch, and a conductor 251 electrically connects the ground side of the lamp 274 to a second terminal 252 of the warning switch.

The third embodiment of the invention further includes a latching relay circuit 278 to maintain the alarm device 274 continuously actuated in response to a momentary fluid pressure unbalance. In the event of such a fluid pressure unbalance, a ferrous contact stud 281 of the switch contact unit is grounded by engagement with the displaced shuttle piston. This completes an electrical circuit through the conductor 279 and the first terminal 280 to energize a relay coil 282. It also completes the ground circuit for alarm device 274 through conductor 251, second terminal 252, conducting diode 256, and conductor 296, thereby actuating the alarm device 274. Energization of relay coil 282 actuates a latching relay switch 283 to provide a supplemental ground for the coil 282 and for the alarm device 274 through a conductor 253. When the pressure unbalance acting on the shuttle piston decreases to permit the piston to return to its center position, the alarm device 274 will remain continuously actuated, since energization of the coil 282 will continue through the supplemental ground connection provided by switch 283. The warning circuit is deactuated by turning off the ignition switch 276, which deenergizes the coil 282 to deactuate the switch 283. When the ignition switch 276 is again turned on, the above-described latching cycle will be repeated when the brake pedal is actuated if a failure still exists.

To provide isolation of the warning circuit from the prove-out circuit to prevent energization of the coil 282 and actuation of the switch 283 when the prove-out switch 277 is closed to test the alarm device 274, the invention provides a diode 256. This aspect of the invention permits the relay coil to be arranged in parallel with the alarm device, and provides such a parallel circuit in which a prove-out circuit can also be used to test the alarm device. One side of the diode 256 is electrically connected to the second terminal 252, and the other side of the diode 256 is electrically connected to the contact stud 281. When the ignition switch 276 is closed, actuation of the prove-out switch 277 completes the prove-out circuit to actuate the alarm device 274. However, the diode 256 is arranged to prevent energization of coil 282 by blocking conventional current flow from the positive side of the battery 275 through the coil 282 and to ground through the closed prove-out switch 277. Of course, if the positive side of the battery 275 is grounded, the polarity of the diode 256 is reversed to prevent current flow in the opposite direction.

Although this aspect of the invention could be practiced by arranging the relay circuit 278 externally of the warning switch, the latching relay circuit 278 is preferably incorporated in a detachable switch contact unit in accordance with the aspects of the invention described in detail hereinbefore primarily in connection with the first embodiment. This is accomplished in the third embodiment as shown in FIG. 8 by providing a detachable switch contact unit 291 which includes a housing 284 having a reduced diameter threaded end portion 285 adapted to be threadably received by a threaded transverse bore in the housing 220. An insulating sleeve 287 is received through the housing 284, and the contact stud is suitably secured within an end portion 288 of the sleeve 287 to electrically insulate the ferrous stud 281 from the housing 220. The insulating sleeve 287 further includes a generally cylindrical projecting skirt portion 289 and radially extending walls 290. The skirt portion 289 of the insulating sleeve serves as a coil form to permit the relay coil 282 to be formed thereon. The relay switch 283 includes a somewhat flexible metallic armature 260 suitably secured to and electrically connected to the contact unit housing 284 by a rivet 261. An axially extending portion 262 of the contact stud 281 serves as a ferromagnetic core for the coil 282 to apply a magnetic force to deflect the armature 260 into contact with its end face 263 when the coil 282 is energized to thereby actuate the switch 283. The insulating sleeve 287 with the coil 282 wound thereon is positioned within the body 284, and an insulating end cap 292 which carries the terminals 280 and 252 is secured in place. The first terminal 280 is electrically connected to one lead of the coil 282 by the conductor 293, and a conductor 294 electrically connects the other side of the coil 282 to the armature 260. The second terminal 252 is electrically connected to the diode 256 by the conductor 295, and the diode 256 is electrically connected to the portion 262 by the conductor 296.

When the stud 281 is momentarily grounded by the shuttle piston to energize the coil 282, the magnetomotive force produced by the coil 282 forces the armature 260 against the end face 263 of the core 262. This completes the above-described warning circuit to actuate the alarm device 274. When the brakes are released and the shuttle piston returns to its center position, the alarm device remains continuously actuated by the supplemental ground provided by the continuously actuated switch 283. It may be appreciated that this supplemental grounding arrangement of the third embodiment provides a fail-safe operation, since the alarm device 274 is momentarily actuated by momentary grounding of the stud 281 even if the switch 283 fails to be actuated by the coil 282.

Although preferred embodiments of the invention have been shown in the drawings and described in detail, various modifications and rearrangements of parts and components may be made without departing from the scope of the invention claimed herein. For example, the various aspects of the invention could be incorporated in a dual master cylinder housing if desired, and the term "switch housing" as used herein includes any such suitable housing.

What is claimed is:

1. A switch for use in a dual fluid pressure system comprising a switch housing, a piston slidably disposed in a bore in said switch housing for movement from a neutral position in response to a fluid pressure unbalance, and a switch contact unit mounted on said switch housing; said switch contact unit including a contact unit housing mounted on said switch housing, a first terminal mounted on said contact unit housing and insulated from said switch housing, a first contact means operable to electrically connect said first terminal to said switch housing only when said piston is moved in said bore from said neutral position in response to a fluid pressure unbalance, and a second contact means operable to continuously electrically connect said first terminal to said switch housing in response to actuation of said first contact means by said movement of said piston, said second contact means maintaining said continuous electrical connection after deactuation of said first contact means by return of said piston to said neutral position, said second contact means being substantially encased within said contact unit housing.

2. A switch as set forth in claim 1, wherein said second contact means includes a relay means, said relay means includes a coil disposed within said contact unit housing and a latching means disposed within said contact unit housing, said latching means being actuated by energization of said coil by said first contact means to continuously electrically connect said first terminal to said switch housing through said coil.

3. A switch as set forth in claim 2, wherein said first contact means includes a contact stud projecting into said bore in said switch housing, said piston engaging said contact stud when said piston is displaced by said pressure unbalance to electrically connect said first terminal to said switch housing through said coil.

4. A switch as set forth in claim 3, wherein said coil is wound upon a portion of said contact stud.

5. A switch as set forth in claim 3, wherein said contact stud is electrically insulated from said switch housing by an insulating sleeve, and said insulating sleeve includes an axially extending skirt portion upon which said coil is wound.

6. A switch as set forth in claim 2, including a second terminal mounted on said contact unit housing and insulated from said switch housing; said latching means includes a first normally open pole which is closed to electrically connect said first terminal to said switch housing through said coil when said latching means is actuated by said coil, and a second normally open pole which is closed to electrically connect said second terminal directly to said switch housing without passing through said coil when said latching means is actuated by said coil.

7. A switch as set forth in claim 2, including a second terminal mounted on said contact unit housing and insulated from said switch housing, and a diode, said latching means electrically connecting said second terminal to said switch housing through said diode when said latching means is actuated by said coil.

8. In a motor vehicle having a dual hydraulic brake system, a warning circuit for actuating an alarm device in response to a fluid pressure unbalance comprising a warning switch; said warning switch including a switch housing, a piston slidably disposed in an axial bore in said switch housing for movement in response to a fluid pressure unbalance, said piston being electrically connected to said switch housing, and a switch contact unit detachably mounted in a transverse bore in said switch housing intersecting said axial bore, said switch contact unit including a contact unit housing, a first terminal mounted on said contact unit housing and insulated from said switch housing, and a relay means mounted in said contact unit housing, said relay means including a coil and a latching means actuated by energization of said coil, said latching means continuously electrically connecting said first terminal to said switch housing through said coil when said piston is moved in response to a fluid pressure unbalance to engage a contact stud and electrically connect said first terminal to said switch housing through said coil and said piston; and a first conductor electrically connecting said first terminal to one side of said alarm device so that the warning circuit is completed through said alarm device when said first terminal is electrically connected to said switch housing.

9. A warning circuit as set forth in claim 8 including a second conductor electrically connecting said one side of said alarm device to a prove-out switch, and said prove-out switch actuating said alarm device independently of said warning switch.

10. A warning circuit as set forth in claim 8 wherein said warning switch is electrically connected in parallel with said alarm device, a prove-out switch actuates said alarm device independently of said warning switch, and an isolation means prevents energization of said coil by said prove-out switch.

11. A warning circuit as set forth in claim 8 including a second terminal mounted on said contact unit housing and insulated from said switch housing, and a second conductor electrically connecting the other side of said alarm device to said second terminal, said latching means including a first normally open pole which is closed to electrically connect said first terminal to said switch housing through said coil when said latching means is actuated by said coil, and a second normally open pole which is closed to electrically connect said second terminal directly to said switch housing without passing through said coil when said latching means is actuated by said coil, a third conductor electrically connecting said other side of said alarm device to a prove-out switch, said prove-out switch actuating said alarm device independently of said warning switch, and said second normally opened pole preventing energization of said coil when said prove-out switch is operated.

12. A warning circuit as set forth in claim 8 including a second terminal mounted on said contact unit housing and insulated from said switch housing, and a diode in said contact unit housing, a second conductor electrically connecting said second terminal to the other side of said alarm device, said latching means electrically connecting said second terminal to said switch housing through said diode when said latching means is actuated by said coil, a third conductor electrically connecting said other side of said alarm device to a prove-out switch, said prove-out switch actuating said alarm device independently of said warning switch, and said diode preventing energization of said coil when said prove-out switch is operated.

13. A circuit comprising a power source, an alarm device, a prove-out circuit and a warning circuit; said prove-out circuit including a means electrically connecting one side of said alarm device to one side of said power source, and a prove-out switch for connecting the other side of said alarm device to the other side of said power source to test said alarm device; said warning circuit including a coil, a relay switch means actuated by energization of said coil, a means electrically connecting one side of said coil to said one side of said power source, a means electrically connecting the other side of said coil to one side of said relay switch means, a means electrically connecting the other side of said relay switch means to said other side of said power source, a warning switch, a means electrically connecting said other side of said coil to one side of said warning switch, a means electrically connecting the other side of said warning switch to said other side of said power source, momentary actuation of said warning switch energizing said coil to actuate said relay switch means, said actuation of said relay switch means continuously actuating said alarm device, and an isolation means substantially isolating said prove-out circuit from said warning circuit to prevent energization of said coil by actuation of said prove-out switch.

14. A circuit as set forth in claim 13 wherein said isolation means includes a second relay switch means actuated by energization of said coil, a means electrically connecting one side of said second relay switch means to said other side of said alarm device, and a means electrically connecting the other side of said second relay switch means to said other side of said power source.

15. A circuit as set forth in claim 13 wherein said isolation means includes a diode, a means electrically connecting one side of said diode to said other side of said alarm device, and a means electrically connecting the other side of said diode to said one side of said warning switch.

* * * * *